United States Patent
Watanabe et al.

(10) Patent No.: US 8,106,635 B2
(45) Date of Patent: Jan. 31, 2012

(54) POWER CONVERTER

(75) Inventors: Yasuto Watanabe, Saitama (JP); Satoshi Hashino, Saitama (JP); Mitsuaki Hirakawa, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 369 days.

(21) Appl. No.: 12/537,440

(22) Filed: Aug. 7, 2009

(65) Prior Publication Data

US 2010/0066341 A1 Mar. 18, 2010

(30) Foreign Application Priority Data

Sep. 18, 2008 (JP) ................................. 2008-239575

(51) Int. Cl.
*G05F 1/613* (2006.01)
(52) U.S. Cl. ........................................ 323/223; 323/282
(58) Field of Classification Search .................. 323/223, 323/224, 225, 282–285, 311, 312, 341
See application file for complete search history.

(56) References Cited

U.S. PATENT DOCUMENTS

| | | | | |
|---|---|---|---|---|
| 6,917,240 B2* | 7/2005 | Trafton et al. | ................. | 327/540 |
| 7,095,220 B2* | 8/2006 | Kernahan | ....................... | 323/300 |
| 7,315,151 B2* | 1/2008 | Thompson et al. | ........... | 323/223 |
| 7,323,829 B2* | 1/2008 | Moyer et al. | ................... | 315/291 |
| 7,522,432 B2* | 4/2009 | Shimizu | ........................... | 363/53 |
| 7,595,613 B2* | 9/2009 | Thompson et al. | ........... | 323/223 |
| 7,746,041 B2* | 6/2010 | Xu et al. | ........................ | 323/223 |
| 7,782,027 B2* | 8/2010 | Williams | ....................... | 323/266 |
| 2006/0038502 A1* | 2/2006 | Moyer et al. | ................... | 315/219 |
| 2011/0038186 A1* | 2/2011 | Kularatna et al. | ............... | 363/37 |

FOREIGN PATENT DOCUMENTS

JP 2005-224059 8/2005
JP 2005-224060 8/2005

* cited by examiner

*Primary Examiner* — Adolf Berhane
(74) *Attorney, Agent, or Firm* — Squire, Sanders & Dempsey (US) LLP

(57) ABSTRACT

A power converter includes an input unit, an output unit, first and second capacitors connected in series, a first electric conduction control device, a second electric conduction control device, a third electric conduction control device, and a fourth electric conduction control device, and a control circuit for performing on/off control on those electric conduction control devices. The first electric conduction control device and the fourth electric conduction control device have a first path through which a current flowing between the input unit and the output unit is allowed to flow in one direction, and a second path which has a switch function of allowing the current flowing between the input unit and the output unit to flow through or shutting off such a current.

4 Claims, 8 Drawing Sheets

| FIG.2A |
|---|
| FIG.2B |

FIG.2A  C2 CHARGING OPERATION

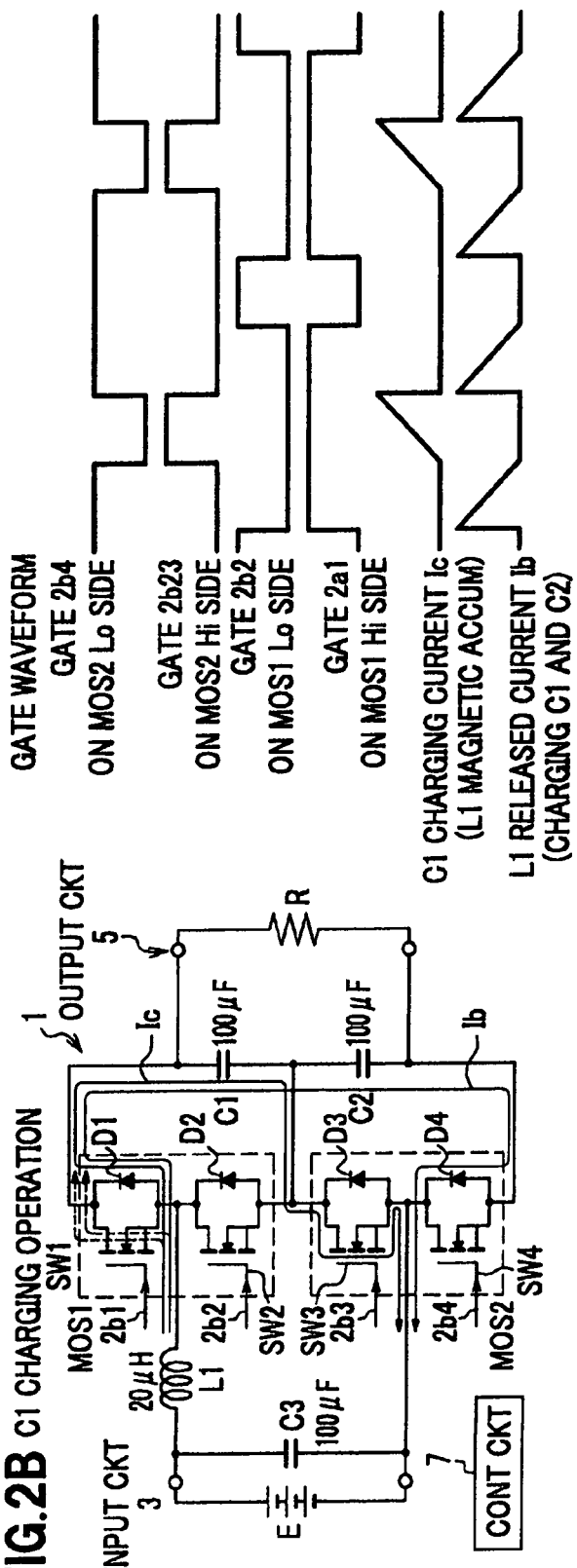

FIG.3 | FIG.3A |
|---|---|
| | FIG.3B |
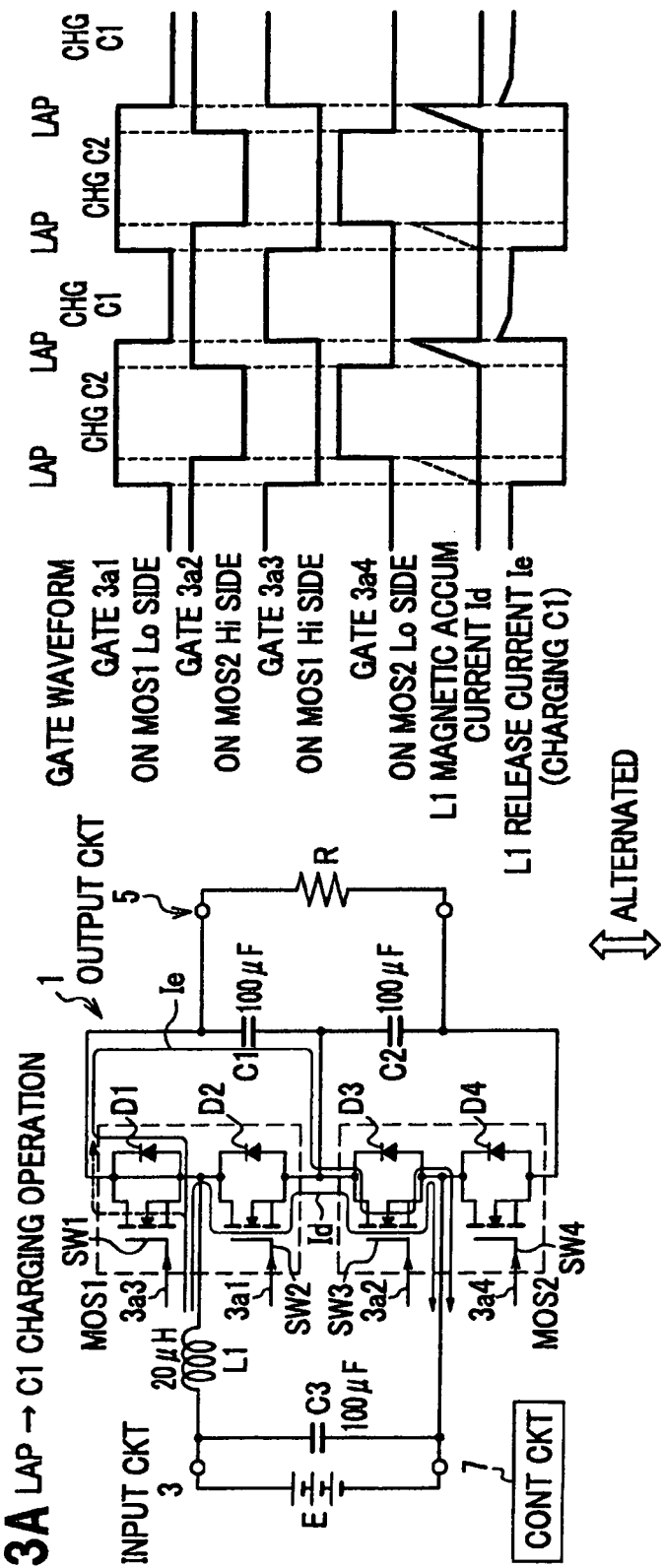
FIG.3A LAP → C1 CHARGING OPERATION

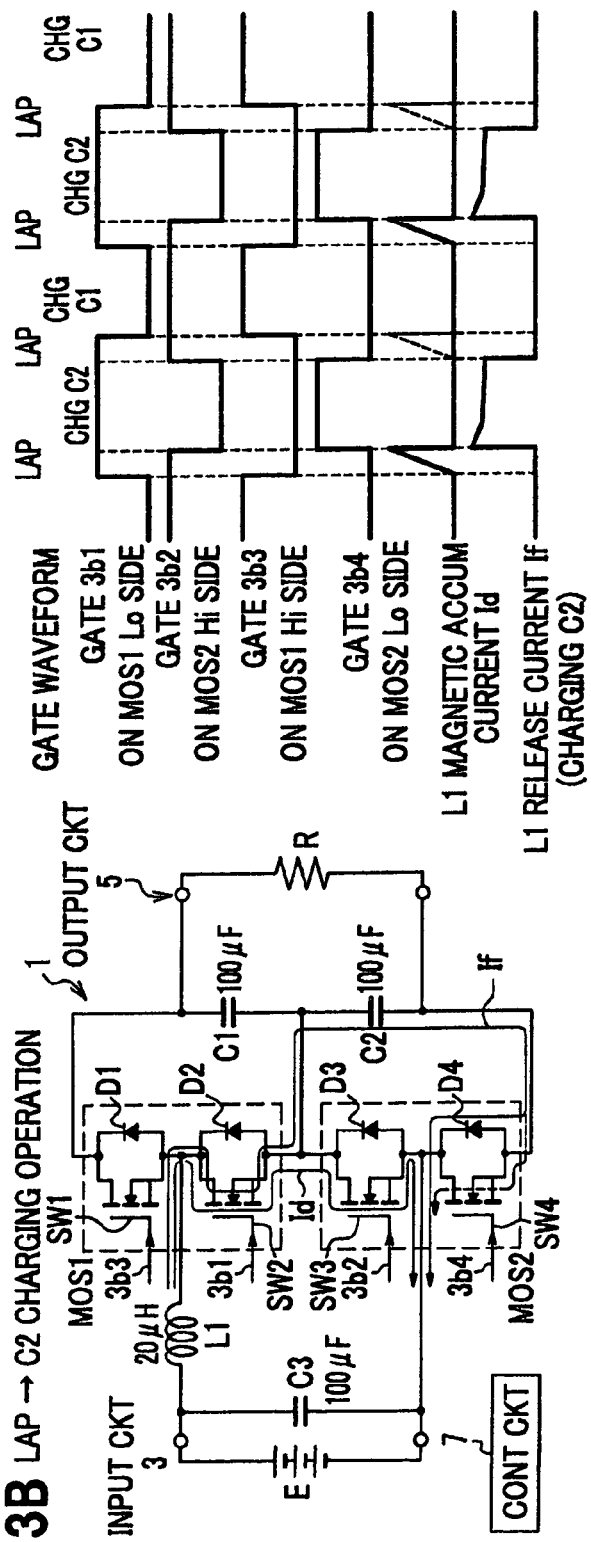

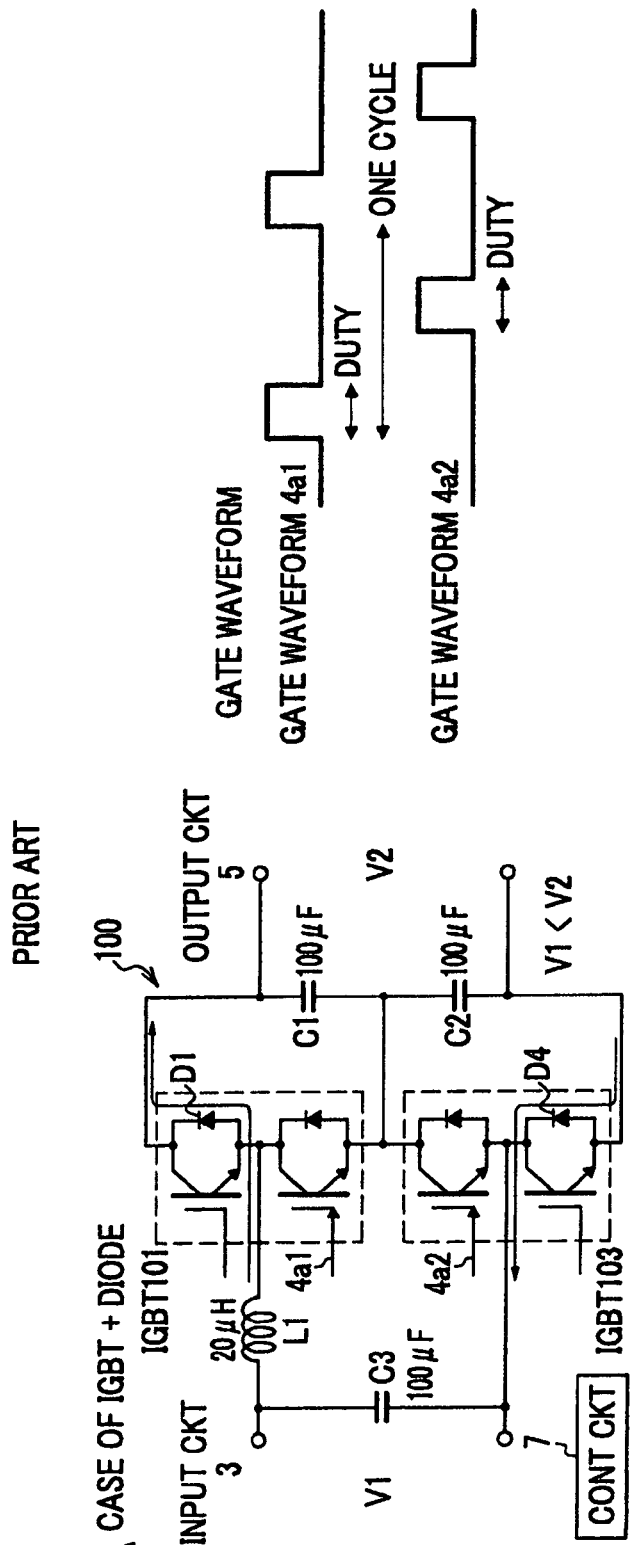
FIG.4A CASE OF IGBT + DIODE PRIOR ART

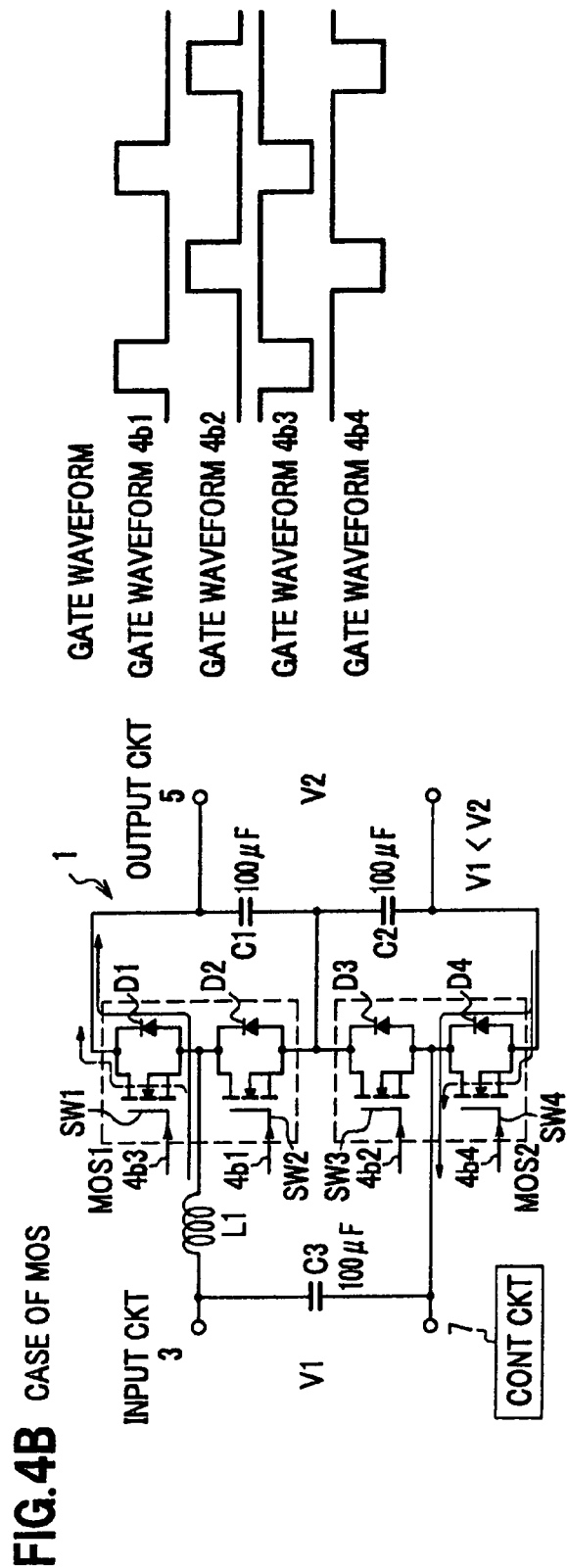
FIG.4B CASE OF MOS

FIG.5A
| Symbol | Characteristic | | Min | Typ | Max | Unit |
|---|---|---|---|---|---|---|
| $I_{DSS}$ | Zero Gate Voltage Drain Current | $V_{GS} = 0V, V_{DS} = 500V$   $T_j = 25°C$ | | | 400 | μA |
| | | $V_{GS} = 0V, V_{DS} = 400V$   $T_j = 125°C$ | | | | |
| $R_{DS(on)}$ | Drain – Source on Resistance | $V_{GS} = 10V, I_D = 90A$ | | 17 | 2000 | mΩ |
| $V_{GS(th)}$ | Date Threshold Voltage | $V_{GS} = V_{DS}, I_D = 10mA$ | 3 | | 20 | V |
| $I_{GSS}$ | Gate – Source Leakage Current | $V_{GS} = ±30V, V_{DS} = 0A$ | | | 5 | |
| | | | | | ±200 | nA |
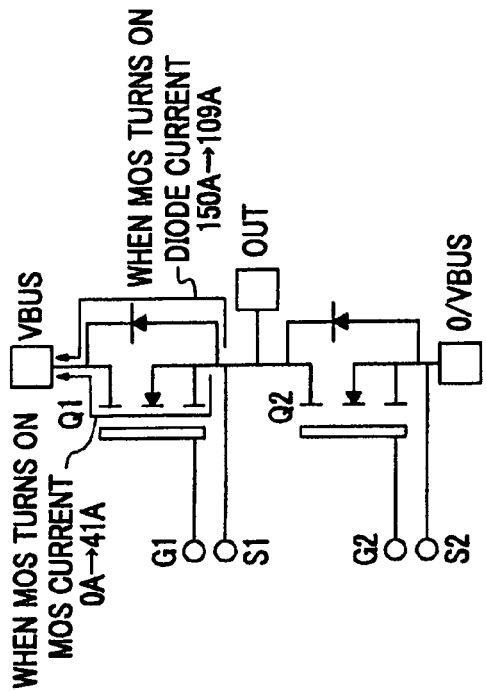
FIG.5C
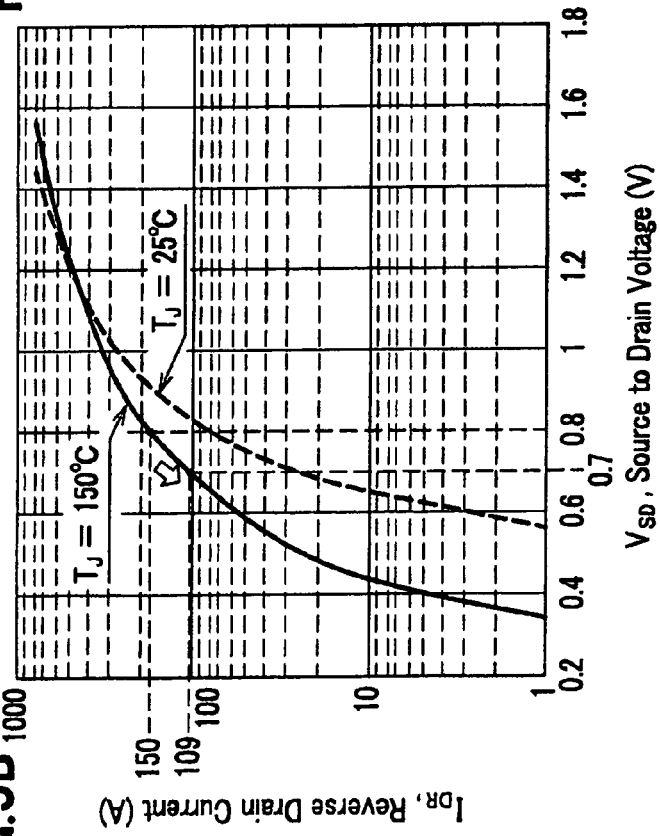
FIG.5B

US 8,106,635 B2

POWER CONVERTER

CROSS REFERENCE TO RELATED APPLICATIONS

This application claims the foreign priority benefit under Title 35, United States Code, §119(a)-(d) of Japanese Patent Application No. 2008-239575, filed on Sep. 18, 2008 in the Japan Patent Office, the disclosure of which is herein incorporated by reference in its entirety.

BACKGROUND OF THE INVENTION

1. Field of the Invention

The present invention relates to a power converter, and more specifically, a power converter which allows a plurality of capacitors to selectively function by on/off control for a plurality of switching devices, thereby boosting/bucking a DC (direct-current) voltage.

2. Description of the Related Art

Conventionally, DC/DC converters perform switching on a predetermined switching device to obtain a desired boosting (bucking) rate when boosting (bucking) an applied DC voltage. Moreover, JP 2005-224059A and JP 2005-224060A disclose a DC/DC converter which adjusts a lap time (simultaneously turning on a plurality of switching devices) when performing switching thereon to realize an improved voltage conversion efficiency and miniaturization of the DC/DC converter itself.

Note that the foregoing DC/DC converter disclosed in JP 2005-224059A and JP 2005-224060A allows a plurality of capacitors to selectively function by on/off control for the plurality of switching devices, thereby performing any one of operations of boosting, conduction, and regeneration.

SUMMARY OF THE INVENTION

A first aspect of the present invention provides a power converter comprising: a first input-output circuit; a second input-output circuit; first and second capacitors connected in series; first to fourth electric conduction control devices; and a control circuit that controls turning on and off of the electric conduction control devices, and wherein: the first electric conduction control device connects a positive terminal of the first input-output circuit to a positive terminal of the first capacitor and a positive terminal of the second input-output circuit; the second electric conduction control device connects the positive terminal of the first input-output circuit to a negative terminal of the first capacitor and a positive terminal of the second capacitor; the third electric conduction control device connects a negative terminal of the first input-output circuit to the negative terminal of the first capacitor and the positive terminal of the second capacitor; the fourth electric conduction control device connects the negative terminal of the first input-output circuit to a negative terminal of the second capacitor and a negative terminal of the second input-output circuit; the first electric conduction control device and the fourth electric conduction control device each comprise a first path allowing a current to flow between the first input-output circuit and the second input-output circuit in one direction, and a second path having a switch function of allowing the current flowing between the first input-output circuit and the second input-output circuit to flow through or to be cut off; a current flowing from the first input-output circuit to the second input-output circuit flows through the first path of the first electric conduction control device from when the control circuit turns on the second electric conduction control device to when the control circuit turns on the third electric conduction control device; a current flows to the first input-output circuit from the second input-output circuit flows through the first path of the fourth electric conduction control device from when the control circuit turns on the third electric conduction control device to when the control circuit turns on the second electric conduction control device; a part of the current flowing through the first path of the first electric conduction control device flows through the second path of the first electric conduction control device as the control circuit turns on the switch function; and a part of the current flowing through the first path of the fourth electric conduction control device flows through the second path of the fourth electric conduction control device as the control circuit turns on the switch function is activated by the control circuit.

According to the first aspect of the present invention, a power converter comprises an electric conduction control device which has a first path and a second path with a switch function. By performing on/off control on such a switch function, some of a current flowing through the first path can be divided and the divided also flows through the second path.

A second aspect of the present invention provides a power converter comprising: a first input-output circuit; a second input-output circuit; first and second capacitors connected in series; first to fourth electric conduction control devices; a control circuit that controls turning on and off the first to fourth electric conduction control devices; and an inductor, and wherein: the first electric conduction control device connects a positive terminal of the first input-output circuit to a positive terminal of the first capacitor and a positive terminal of the second input-output circuit; the second electric conduction control device connects the positive terminal of the first input-output circuit to a negative terminal of the first capacitor and a positive terminal of the second capacitor; the third electric conduction control device connects a negative terminal of the first input-output circuit to the negative terminal of the first capacitor and the positive terminal of the second capacitor; the fourth electric conduction control device connects the negative terminal of the first input-output circuit to a negative terminal of the second capacitor and a negative terminal of the second input-output circuit; the first electric conduction control device and the fourth electric conduction control device each comprises a first path allowing a current to flow between the first input-output circuit and the second input-output circuit in one direction, and a second path having a switch function of allowing the current flowing between the first input-output circuit and the second input-output circuit to flow through or to be cut off; the second electric conduction control device and the third electric conduction control device each have at least the switch function; a current flows to the second input-output circuit from the first input-output circuit flows through the first path of the first electric conduction control device from when the control circuit turns on the second electric conduction control device to when the control circuit turns on the third electric conduction control device; the control circuit turns on the switch function to flow a current from the second input-output circuit through the first path of the fourth electric conduction control device to the first input-output circuit to when the control circuit turns on the third electric conduction control device from when the control circuit turns on the second electric conduction control device; a part of the current flowing through the first path of the first electric conduction control device flows through the second path of the first electric conduction control device as the switch function is turned on by the control circuit; a part of the current flowing through the first path of the fourth electric conduction control device flows through the second path of the fourth electric conduction control device as the switch function is turned on by the control circuit; and the power converter has a period that the switch function of the second electric conduction control device and the switch function of the third electric conduction control device are simultaneously turned on by the control circuit while the switch function of the first electric conduction control device and the switch function of the fourth electric conduction control device are turned off.

According to the second aspect of the present invention, a power converter allows a control circuit to perform on/off control on each electric conduction control device in order to energize first and second capacitors connected in series, thereby boosting an applied voltage. A current flows through not only a first path of each electric conduction control device but also a second path thereof when the voltage is boosted, so that a conduction loss can be reduced.

A third aspect of the present invention provides the power converter according to the second aspect, wherein the inductor is provided on a positive terminal side of the first input-output circuit or a negative terminal side thereof.

According to the third aspect of the present invention, as a power converter further comprises an inductor, so that a boosting (bucking) ratio can be set variable.

A fourth aspect of the present invention provides the power converter according to the first aspect, wherein each of the electric conduction control device includes a Metal-Oxide-Semiconductor Field-Effect Transistor (MOSFET).

According to the fourth aspect of the present invention, a power converter employs a MOSFET as an electric conduction control device. Conventionally, it is necessary to separately prepare a diode when an IGBT is used as a electric conduction control device, but such a diode can be substituted by a parasitic diode of the MOSFET, thus simplifying the structure of the power converter. Moreover, according to the power converter of the present invention, by increasing the number of chips of MOSFETs, it is possible to reduce a resistance inversely proportional to the increased number, and when a current is allowed to flow into a capacitor to charge it, a conduction loss in the electric conduction control device can be reduced, thus improving the voltage conversion efficiency.

BRIEF DESCRIPTION OF THE DRAWINGS

The object and features of the present invention will become more readily apparent from the following detailed description taken in conjunction with the accompanying drawings in which:

FIG. 2A is a diagram showing a flow of a current and a gate waveform in a charging operation of a second capacitor in the power converter in FIG. 1 in a case in which a boosting ratio is small (less than twice);

FIG. 2B is a diagram of flows of currents and gate waveforms in a charging operation of the first capacitor in the power converter in FIG. 1 in a case in which the boosting ratio is small (less than twice);

FIG. 3 shows a connection between FIGS. 3A and 3B;

FIG. 3A is a diagram showing flows of currents and gate waveforms in an operation from lap charging to charging of the first capacitor in the power converter in FIG. 1 in a case in which a boosting ratio is large (greater than or equal to twice);

FIG. 3B is a diagram showing flows of currents and gate waveforms in an operation from lap charging to charging of the second capacitor in the power converter in FIG. 1 in a case in which a boosting ratio is large (greater than or equal to twice);

FIG. 4A is a diagram showing a switch circuit of a prior art power converter and gate waveforms for comparison with the present invention;

FIG. 4B is a diagram showing a switch circuit of the power converter and a gate waveform according to the embodiment of the present invention;

FIG. 5A is a table showing characteristics of a electric conduction controller when a current of 150 A is allowed to flow through a parasitic diode for explaining an example of a reduced conduction loss;

FIG. 5B is a diagram for explaining reduction of a voltage drop in a parasitic diode; and FIG. 5C is an exemplary diagram showing how a current is divided and the divided currents flow through a parasitic diode and a switch unit.

The same or corresponding elements or parts are designated with like references throughout the drawings.

DETAILED DESCRIPTION OF THE INVENTION

Prior to an explanation for an embodiment of the present invention, an explanation will be given of the foregoing conventional technology in detail.

According to the foregoing conventional DC/DC converter, there is a period that only a diode which is one of the switching effect is conducted when switching is performed on the switching devices. Therefore, there is a problem that a conduction loss of such a diode becomes large.

Thus, it is an object of the present invention to provide a power converter which can reduce the conduction loss in a diode.

According to the present invention, a current which flows through an electric conduction control device is divided. The divided currents flow through a first path and a second path, so that it is possible to reduce the conduction loss, and to set the withstanding current capacitance of the electric conduction control device small, thereby miniaturizing a power converter. Moreover, according to the present invention, it is possible to simplify the structure of the power converter.

An explanation will be given of an embodiment of the present invention with reference to accompanying drawings.

<Structure of Power Converter>

Figure 1:
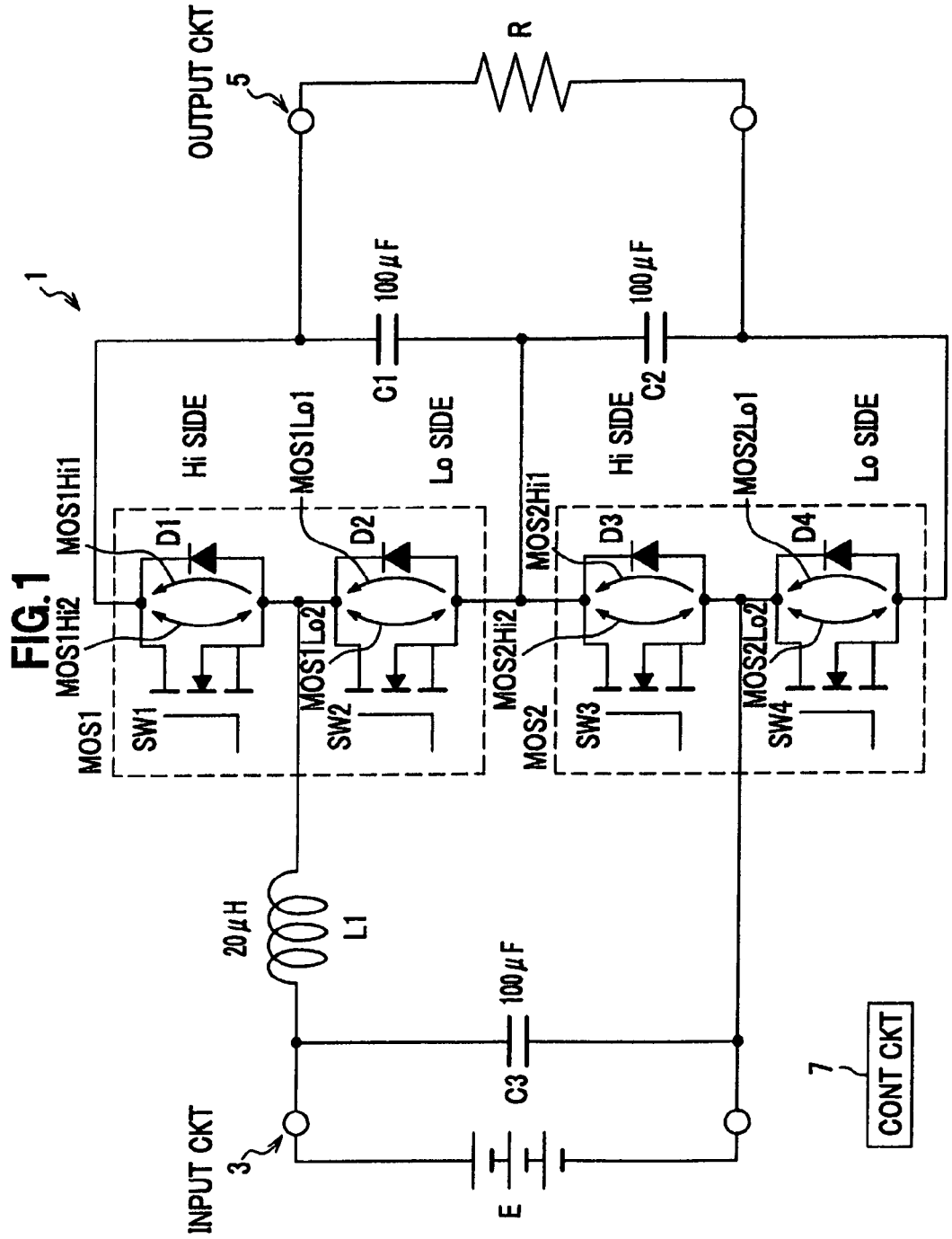
FIG. 1 is a circuit diagram showing a power converter (MOS) according to an embodiment of the present invention.

FIG. 1 is a circuit diagram showing a power converter. A power converter 1 is for boosting (or bucking) an applied voltage. As shown in FIG. 1, the power converter 1 comprises an input unit (first input-output circuit) 3, an output unit (second input-output circuit) 5, a (first) capacitor C1, a (second) capacitor C2, a capacitor C3, an inductor L1, a electric conduction controller MOS1, a electric conduction controller MOS2, and a control circuit 7.

The power converter 1 is configured with MOSFETs (Metal-Oxide-Semiconductor Field-Effect Transistors) which has been configured with IGBTs (Insulated Gate Bipolar Transistors) that have a high withstanding voltage as electric conduction control devices. According to the conventional structure of the electric conduction control device, a diode is provided together with the IGBT, and a current is allowed to flow through the diode in a direction opposite to the conduction direction of the IGBT.

In the power converter 1, however, a current flowing only through the diode is shunted to flow separately through two paths: a path (first path) through which the current flows via a parasitic diode of a MOSFET; and a path (second path) through which the current starts flowing when an ON voltage (a voltage for a conduction state) is applied by merely changing a switching timing of the electric conduction controller MOS1 and that of the electric conduction controller MOS2. As a result, according to the power converter 1, it is possible to obtain an equivalent effect that the ON voltage of the conventional diode is reduced. That is, according to the power converter 1, it is possible to reduce the conduction loss. Further, according to the power converter 1, it is possible to set the withstanding current capacitance of the electric conduction controller MOS1 and that of the electric conduction controller MOS2 small, so that the size of the electric conduction controller MOS1 and that of the electric conduction controller MOS2 can be reduced, thereby accomplishing reduction in size and weight of the power converter 1.

The input unit 3 is connected to a direct-current power source E (V), and is a part to which a voltage is applied. A positive terminal of the input unit 3 is connected to a positive terminal of the capacitor C1 and a positive terminal of the output unit 5 via the inductor L1 and the electric conduction controller MOS1. Moreover, a negative terminal of the input unit 3 is connected to a negative terminal of the capacitor C2 via the electric conduction controller MOS2.

The output unit 5 is connected to a load resistor R, and is a part outputting a boosted voltage. A positive terminal of the output unit 5 is connected to the positive terminal of the capacitor C1. Moreover, a negative terminal of the output unit 5 is connected to the negative terminal of the capacitor C2.

In the power converter 1, in a boosting mode operation for boosting an applied voltage, the input unit (first input-output circuit) 3 operates as a circuit for inputting, while the output unit (second input-output circuit) 5 operates as a circuit for outputting. Conversely, a relation between inputting and outputting becomes inverted in a bucking mode operation. That is, the input unit (first input-output circuit) 3 operates as a circuit for outputting, while the output unit (second input-output circuit) 5 operates as the circuit for inputting.

The capacitor C1 and the capacitor C2 are connected in series, and alternately charged/discharged (charging/discharging) electrical charge (current and released current). In the embodiment, the capacitors C1, C2 each comprises a film capacitor of 100 µF.

The capacitor C3 is a smoothing capacitor. When an impedance of the power source E for applying a voltage to the input unit 3 is high, the capacitor C3 is provided for decreasing the impedance and is provided for stabilizing an operation when a voltage from the output unit 5 is boosted. The capacitor C3 can be omitted if the input impedance of the power source E is sufficiently low. In the embodiment, the capacitor C3 comprises a chemical capacitor of 100 µf, but may be a film capacitor.

The inductor L1 is connected to the positive terminal (or negative terminal) of the input unit 3, and is for accumulating a current supplied from the input unit 3 as magnetic energy and supplying such a current as a released current to the capacitors C1, C2 by a switching operation of the electric conduction controller MOS1. In the embodiment, the value of the inductor L1 is 20 µH.

The electric conduction controller MOS1 comprises two (a pair) MOS devices (Hi side and Lo side), and has a first path where respective parasitic diodes D1, D2 are formed, and a second path where switch units SW1, SW2 are provided. The Hi side of the electric conduction controller MOS1 is connected to the positive terminal of the capacitor C1, while the Lo side thereof is connected to the negative terminal of the capacitor C1.

Hereinafter, the first path on the Hi side of the electric conduction controller MOS1 is referred to as MOS1Hi1 (first path on Hi side), and the second path on the Lo side of the electric conduction controller MOS1 is referred to as MOS1Hi2 (second path on a Hi side). A normal path on the Lo side is referred as MOS1Lo1 (first path on Lo side), and the second path is referred as MOS1Lo2 (second path on Lo side).

The parasitic diodes D1, D2 are inevitably formed in such a manner as to conduct in one direction from a source of the electric conduction controller MOS1 to a drain thereof because of the structure of the MOSFET.

The switch units SW1, SW2 are subjected to on/off control by the control circuit 7.

The first path MOS1Hi1 is a path where a released current from the inductor L1 flows during charging the capacitors C1, C2 when a boosting ratio is one to twice. Moreover, the first path MOS1Hi1 is a path where a part of a current which charges the capacitor C1 (a current supplied from the power source E connected to the input unit 3) during charging of the capacitor C when the boosting ratio is one to twice. At this time, the inductor L1 is performing magnetic accumulation.

Furthermore, the first path MOS1Hi1 is a path through which a current supplied from the power source E connected to the input unit 3 and a part of a released current from the inductor L1 flow when the capacitor C1 is charged with the boosting ratio being greater than or equal to twice.

The second path MOS1Hi2 is not conducted when the capacitor C2 is charged when the boosting ratio is from one to twice. Moreover, the second path MOS1Hi2 is a path through which a part of the released current from the inductor L1 and some of a charging current (a current supplied from the power source E connected to the input unit 3) flow when the capacitor C1 is charged with the boosting ratio being from one to twice. At this time, the inductor L1 is performing magnetic accumulation.

Furthermore, the second path MOS1Hi2 is a path through which a part of a released current from the inductor L1 flows when the control circuit 7 turns on the switch unit SW1 in the case of the boosting ratio being greater than or equal to twice.

The first path MOS1Hi1 is not conducted when the capacitor C2 is charged.

The first path MOS1Lo1 is not conducted when the capacitor C1 is charged and when the capacitor C2 is charged in a case of the boosting ratio being from one to twice. Moreover, the first path MOS1Lo1 is not conducted when the capacitor C1 is charged and when the capacitor C2 is charged in the case of the boosting ratio being greater than or equal to twice.

The second path MOS1Lo2 is not conducted when the capacitor C1 is charged in the case of the boosting ratio being from one to twice. Moreover, the second path MOS1Lo1 is a path through which a charging current (a current supplied from the power source E connected to the input unit 3) flows when the capacitor C2 is charged in the case of the boosting ratio being from one to twice. At this time, the inductor L1 is performing magnetic accumulation.

Furthermore, the second path MOS1Lo2 is a path conducted in order to cause the inductor L1 to perform magnetic accumulation when the capacitor C1 is charged and when the capacitor C2 is charged as the control circuit 7 turns on the switch unit SW2 in the case of the boosting ratio being greater than or equal to twice.

The electric conduction controller MOS2 comprises two (a pair) MOS devices (Hi side and Lo side), and has a first path where parasitic diodes D3, D4 are respectively formed, and a second path where switch units SW3, SW4 are provided. The Hi side of the electric conduction controller MOS2 is connected to the positive terminal of the capacitor C2, while the Lo side is connected to the negative terminal of the capacitor C2.

A first path on the Hi side of the electric conduction controller MOS2 is referred as MOS2Hi1, and a second path is referred as MOS2Hi2. A first path on the Lo side is referred as MOS2Lo1, and a second path on the Lo side is referred as MOS2Lo2.

The parasitic diodes D3, D4 are inevitably formed in such a manner as to conduct in one direction from a source of the electric conduction controller MOS2 to a drain thereof because of the structure of a MOSFET.

The switch units SW3, SW4 are subjected to on/off control by the control circuit 7.

The first path MOS2Hi1 is not conducted when the capacitor C1 is charged and when the capacitor C2 is charged in the case of the boosting ratio being from one to twice. Moreover, the first path MOS2Hi1 is not conducted when the capacitor C1 is charged and when the capacitor C2 is charged in the case of the boosting ratio being greater than or equal to twice.

The second path MOS2Hi2 is a path which is not conducted when the capacitor C2 is charged in the case of the boosting ratio being from one to twice. Moreover, the second path MOS2Hi2 is a path through which a charging current (a current supplied from the power source E connected to the input unit 3) flows when the capacitor C1 is charged in the case of the boosting ratio being from one to twice. At this time, the inductor L1 is performing magnetic accumulation.

Furthermore, the second path MOS2Hi2 is a path conducted in order to cause the inductor L1 to perform magnetic accumulation when the capacitor C1 is charged and when the capacitor C2 is charged as the control circuit 7 turns on the switch unit SW3 in the case of the boosting ratio being greater than or equal to twice.

The first path MOS2Lo1 is a path through which a released current from the inductor L1 flows when the capacitor C1 is charged and when the capacitor C2 are charged in the case of the boosting ratio being from one to twice. Moreover, the first path MOS2Lo1 is a path through which a charging current (a current supplied from the power source E connected to the input unit 3) flows when the capacitor C2 is charged in the case of the boosting ratio being from one to twice. At this time, the inductor L1 is performing magnetic accumulation.

Furthermore, the first path MOS2Lo1 is a path through which a released current from the inductor L1 flows when the capacitor C2 is charged in the case of the boosting ratio being greater than or equal to twice. The first path MOS2Lo1 is a path which is not conducted when the capacitor C1 is charged.

The second path MOS2Lo2 is a path which is not conducted when the capacitor C1 is charged in the case of the boosting ratio being from one to twice. Moreover, the second path MOS2Lo2 is a path through which a part of a released current from the inductor L1 and a part of a charging current (a current supplied from the power source E connected to the input unit 3) flow when the capacitor C2 is charged with the boosting ratio being from one to twice. At this time, the inductor L1 is performing magnetic accumulation.

Furthermore, the second path MOS2Lo2 is a path through which a part of a released current from the inductor L1 flows as the control circuit 7 turns on the switch unit SW4 in the case of the boosting ratio being greater than or equal to twice. The second path MOS2Lo2 is a path which is not conducted when the capacitor C1 is charged.

The control circuit 7 performs on/off control on the switch units SW1, SW2 of the electric conduction controller MOS1 and the switch units SW3, SW4 of the electric conduction controller MOS2.

<Flow of Current and Voltage Waveform>

Figure 2:
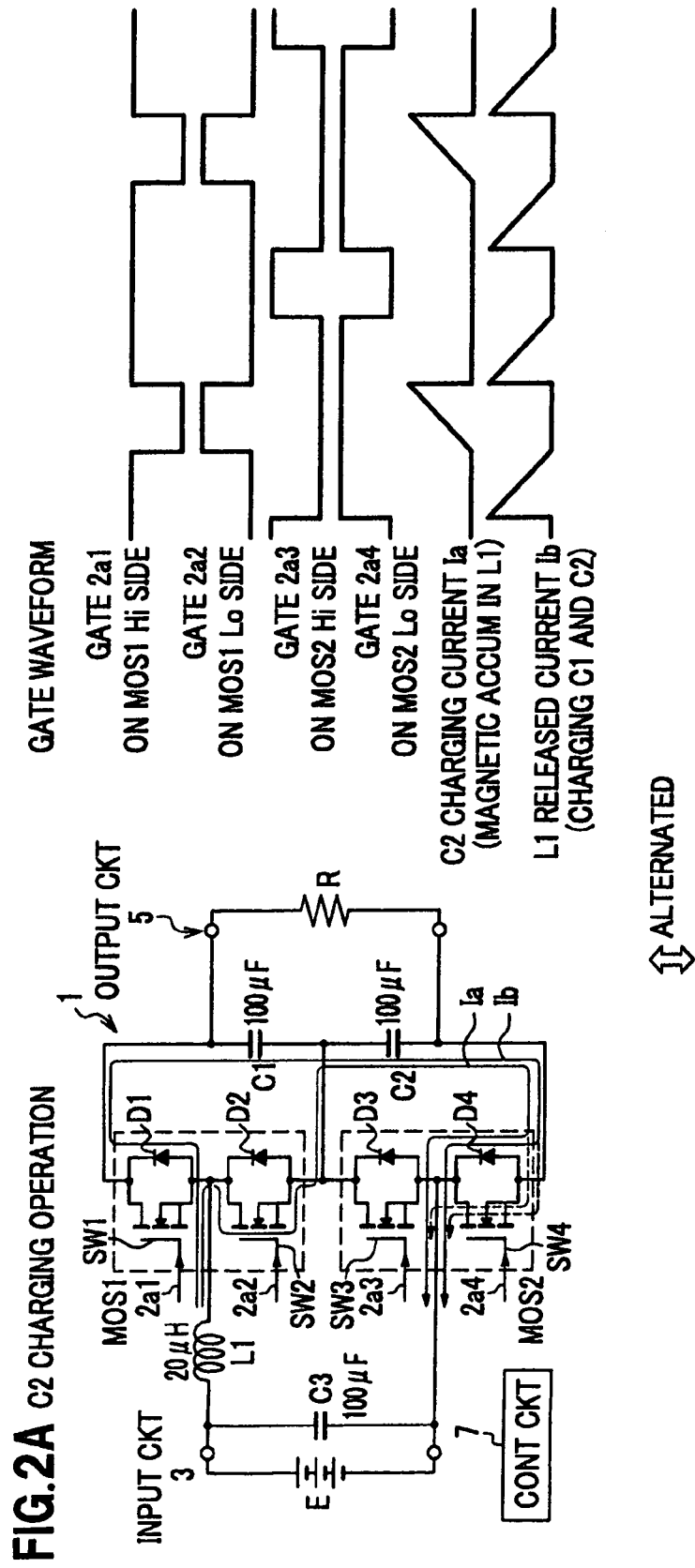
FIG. 2 shows a connection between FIGS. 2A and 2B.

Next, an explanation will be given of a flow of a current in the power converter 1 and a voltage waveform with reference to FIGS. 2A, 2B, 3A, and 3B (also FIG. 1 appropriately). FIGS. 2A, 2B show a flow of a current, a gate voltage of the electric conduction controller MOS1 and that of the electric conduction controller MOS2, waveforms of charging currents for the capacitors C1 and C2, and a waveform of a released current from the inductor L1 when the boosting ratio is small (from one to twice).

As shown in FIGS. 2A, 2B, in the power converter 1, boosting (magnetic accumulation) is carried out through the inductor L1 simultaneously as the capacitors C1, C2 are charged when the boosting ratio is small (from one to twice).

As shown in FIG. 2A with gate waveforms $2a1$ to $2a4$, the power converter 1 causes the control circuit 7 to alternately turn on a Lo-side gate of the electric conduction controller MOS1 and a Hi-side gate of the electric conduction controller MOS2 without lapping (duty ratio: less than or equal to 50%). The power converter 1 causes a Lo-side gate of the electric conduction controller MOS2 to be on from when the Hi-side gate of the electric conduction controller MOS2 is caused to be off to a rising time that the Hi-side gate of the electric conduction controller MOS2 is caused to be on.

In the power converter 1, a charging current (magnetic accumulation by the inductor L1) Ia flows into the capacitor C2 while the Lo-side gate of the electric conduction controller MOS1 is on. Moreover, in the power converter 1, a released current Ib from the inductor L1 flows from a fall-down time that the state of the Lo-side gate of the electric conduction controller MOS1 is changed from on to off to a rising time that the Hi-side gate of the electric conduction controller MOS2 is caused to be on.

As shown in FIG. 2A with "C2 charging operation", the charging current Ia flowing into the capacitor C2 passes through the second path MOS1Lo2 of the Lo side of the electric conduction controller MOS1 from the inductor L1, passes through the capacitor C2, and divided currents flow through the first path MOS2Lo1 (a path indicated by a thin line) of the Lo side of the electric conduction controller MOS2 and the second path MOS2Lo2 (a path indicated by a dashed line) thereof. The released current Ib from the inductor L1 passes through the capacitors C1, C2 from the first path MOS1Hi1 of the Hi side of the electric conduction controller MOS1, and divided currents flow into the first path MOS2Lo1 (a path indicated by a thin line) of the Lo side of the electric conduction controller MOS2 and the second path MOS2Lo2 (a path indicated by a dashed line) of the electric conduction controller MOS2.

As shown in FIG. 2B with gate waveforms $2b1$ to $2b4$, the power converter 1 causes the control circuit 7 to alternately turn on the Hi-side gate of the electric conduction controller MOS2 and the Lo-side gate of the electric conduction controller MOS1 (duty ratio: less than or equal to 50%). The power converter 1 turns on the Hi-side gate of the electric conduction controller MOS1 from when the power converter 1 turns off the Lo-side gate of the electric conduction controller MOS1 to a rising time that the power converter 1 turns on the Lo-side gate of the electric conduction controller MOS1.

In the power converter 1, a charging current (magnetic accumulation by the inductor L1) Ic flows into the capacitor C1 while the Hi-side gate of the electric conduction controller MOS2 is on. Moreover, in the power converter 1, the released current Ib from the inductor L1 flows from a fall-down time that the state of the Hi-side gate of the electric conduction controller MOS2 is changed from on to off to a rising time that the power converter 1 turns on the Lo-side gate of the electric conduction controller MOS1.

As shown in FIG. 2B with "C1 charging operation", the charging current Ic flowing into the capacitor C1 is divided. The divided currents flow through the first path MOS1Hi1 (thin line) of the Hi side of the electric conduction controller MOS1 and the second path MOS1Hi2 (dashed line) thereof from the inductor L1, pass through the capacitor C1, and flow through the second path MOS2Hi2 of the Hi side of the electric conduction controller MOS2. Moreover, the released current Ib by the inductor L1 is divided. The divided currents flow through the first path MOS1Hi1 (indicated by a thin line) of the Hi side of the electric conduction controller MOS1 and the second path MOS1Hi2 (indicated by a dashed line) thereof, passes through the capacitors C1, C2, and flow through the first path MOS2Lo1 of the Lo side of the electric conduction controller MOS2.

As shown in FIGS. 3A, 3B, in the power converter 1, when the boosting ratio is large (greater than or equal to twice), first, the capacitor C1 and the capacitor C2 are alternately charged, a period that the electric conduction controllers MOS1 and MOS2 are simultaneously turned on (lapped with each other, duty ratio is set to be greater than or equal to 50%) is generated, so that a current is rapidly flow through the inductor L1 and is released. This generates a boosted voltage which is alternately charged in the capacitor C1 and the capacitor C2.

As shown in FIG. 3A with gate waveforms 3a1 to 3a4, the power converter 1 causes the control circuit 7 alternately turn on a Lo-side gate of the electric conduction controller MOS1 and a Hi-side gate of the electric conduction controller MOS2 with a lapping period. The power converter 1 turns on the Hi-side gate of the electric conduction controller MOS1 between a fall-down time that the state of the Lo-side gate of the electric conduction controller MOS1 is changed from on to off and a rising time that such a gate is caused to be on next.

In the power converter 1, during a turn on period of the Lo-side gate of the electric conduction controller MOS1 and that of the Hi-side gate of the electric conduction controller MOS2 lapped with each other, the inductor L1 effects magnetic accumulation Id. Moreover, in the power converter 1, a released current Ie from the inductor L1 flows into the capacitor C1 while the Hi-side gate of the electric conduction controller MOS1 is on, so that the capacitor C1 is charged.

As shown in FIG. 3A with "lapping to C1 charging operation", the charging current (released current) Ie flowing into the capacitor C1 is divided. The divided currents flow through the first path MOS1Hi1 (a path indicated by a thin line) of the Hi side of the electric conduction controller MOS1 and the second path MOS1Hi2 (a path indicated by a dashed line), passes through the capacitor C1, and flows through the second path MOS2Hi2 of the Hi side of the electric conduction controller MOS2. Moreover, the magnetic accumulation Id by the inductor L1 is effected in the period of lapping as a current flows through the second path MOS1Lo2 of the Lo side of the electric conduction controller MOS1, and the second path MOS2Hi2 of the Hi side of the electric conduction controller MOS2 from the input unit 3.

As shown in FIG. 3B with gate waveforms 3b1 to 3b4, the power converter 1 causes the control circuit 7 alternately turns on the Lo-side gate of the electric conduction controller MOS1 and the Hi-side gate of the electric conduction controller MOS2 with an lapping period. The power converter 1 turns on the Lo-side gate of the electric conduction controller MOS2 between a fall-down time that the state of the Hi-side gate of the electric conduction controller MOS2 is changed from on to off and a rising time that such a gate is caused to be on next.

In the power converter 1, the inductor L1 acquires magnetic accumulation Id during turn on period of the Lo-side gate of the electric conduction controller MOS1 and that of the Hi-side gate of the electric conduction controller MOS2 lapped with each other. Moreover, in the power converter 1, a released current If from the inductor L1 flows into the capacitor C2 while the Lo-side gate of the electric conduction controller MOS2 is on, so that the capacitor C2 is charged.

As shown in FIG. 3B with "lapping to C2 charging operation", the charging current (released current) If flowing into the capacitor C2 flows through the second path MOS1Lo2 of the Lo side of the electric conduction controller MOS1 from the inductor L1, passes through the capacitor C2, and is divided. The divided currents flow through the first path MOS2Lo1 (indicated by a thin line) of the Lo side of the electric conduction controller MOS2 and the second path MOS2Lo (indicated by a dashed line) thereof. Regarding the magnetic accumulation Id by the inductor L1, a current flows through the second (bypass) path MOS1Lo2 of the Lo side of the electric conduction controller MOS1 and the second path MOS2Hi2 of the Hi side of the electric conduction controller MOS2 during lapping.

<Effect in Comparison with Conventional Technology>

Next, an explanation will be given of the power converter 1 in comparison with a conventional power converter (employing an IGBT and a diode as a electric conduction control device) with reference to FIGS. 4A, 4B.

As shown in FIG. 4A with gate waveforms 4a1 and 4a2, in the case of a conventional power converter 100, a Lo side of an IGBT 101 and a Hi side of an IGBT 103 are switched. Accordingly, as shown in FIG. 4A with "in case of IGBT and diode", a current flows through merely a diode of a Hi side of the IGBT 101 and a diode of a Lo side of the IGBT 103 which are not subjected to switching.

In contrast, as shown in FIG. 4B, in the case of the power converter 1, because switching is performed at a timing that a current flows through the parasitic diode D1 of the electric conduction controller MOS1, the current also flows through the second path MOS1Hi2. Moreover, because switching is performed at a timing that a current flows through the parasitic diode D4 of the electric conduction controller MOS2, the current also flows through the second path MOS2Lo2. Therefore, the power converter 1 can reduce a conduction loss in comparison with the conventional power converter 100. This is because of the difference between the characteristics of an IGBT device and the characteristics of a MOSFET. In the case of MOSFET, because a direction in which a current can flow is not limited to only one direction, by positively utilizing a second path, it is possible to reduce a conduction loss in comparison with a case in which a current is allowed to flow merely through a diode in the conventional power converter. Moreover, in the case of the conventional power converter 100, because the IGBTs 101, 103 are used, the flowing direction of a current is set beforehand, so that such switching performed by the power converter 1 cannot be carried out. Note that as shown in FIG. 4B, a gate waveform 4b1 and a gate waveform 4b3 have an inverted on/off relationship, and the same is true of a gate waveform 4b2 and a gate waveform 4b4.

<Conduction Loss>

Next, an explanation will be given of an example of a conduction loss reduced by the power converter 1 with reference to FIGS. 5A to 5C (also FIG. 1 appropriately).

FIG. 5A shows characteristics of the electric conduction controllers MOS1, MOS2 when the switch unit SW1 which is a switch for a bypass is turned on while a current of 150 A is being allowed to flow through any one of parasitic diodes D1 to D4 (in the embodiment, D1) of the electric conduction controllers MOS1, MOS2.

In FIG. 5A, $I_{DSS}$ represents a current across a drain and a source, $R_{DS(on)}$ represents a resistance, across the drain and the source when the switch unit SW1 is turned on, $V_{GS(th)}$ represents a threshold voltage across a gate and the source, and $I_{GSS}$ represents a current across the gate and, the source.

$V_{GS}$ represents a voltage across the gate and the source, $V_{DS}$ represents a voltage across the drain and the source, and $I_D$ represents a drain current.

Because of the characteristics of the electric conduction controllers MOS1, MOS2, when the switch unit SW1 is turned on while a current of 150 A is flowing through the parasitic diode D1, as an ON resistance is 17 mΩ, as is exemplary shown in FIG. 5C, a current of 41 A flows through the second path where the switch unit SW1 is provided, and the remaining current of 109 A flows through the diode D1. FIG. 5B shows a relationship between a reduction of the current and a drop of a voltage of the parasitic diode D1 in this case.

As shown in FIG. 5B, the voltage of the parasitic diode D1 drops from 0.8 V to 0.7 V.

Thus, a conduction loss (loss difference) becomes 150 A×(0.8 V−0.7 V)=15 W. For example, conventional power converters are of 100 V, 150A, and 150 W standard, if a conversion efficient is 97%, a conduction loss of 450 W is caused. However, by turning on the switch unit SW1 while a current is flowing through the parasitic diode D1, and by allowing the current to flow through the second path where the switch unit SW1 is provided, at least a conduction loss of 15 W (15 W/450 W=3.3%) can be reduced.

The explanation has been given of the embodiment of the present invention, but the present invention is not limited to the foregoing embodiment. For example, the explanation has been given of a boosting operation of the power converter 1, but the present invention can be applied to a bucking operation thereof.

The invention claimed is:

1. A power converter comprising:
a first input-output circuit;
a second input-output circuit;
first and second capacitors connected in series;
first to fourth electric conduction control devices; and
a control circuit that controls turning on and off of the electric conduction control devices, and wherein:
the first electric conduction control device connects a positive terminal of the first input-output circuit to a positive terminal of the first capacitor and a positive terminal of the second input-output circuit;
the second electric conduction control device connects the positive terminal of the first input-output circuit to a negative terminal of the first capacitor and a positive terminal of the second capacitor;
the third electric conduction control device connects a negative terminal of the first input-output circuit to the negative terminal of the first capacitor and the positive terminal of the second capacitor;
the fourth electric conduction control device connects the negative terminal of the first input-output circuit to a negative terminal of the second capacitor and a negative terminal of the second input-output circuit;
the first electric conduction control device and the fourth electric conduction control device each comprise a first path allowing a current to flow between the first input-output circuit and the second input-output circuit in one direction, and a second path having a switch function of allowing the current flowing between the first input-output circuit and the second input-output circuit to flow through or to be cut off;
a current flowing from the first input-output circuit to the second input-output circuit flows through the first path of the first electric conduction control device from when the control circuit turns on the second electric conduction control device to when the control circuit turns on the third electric conduction control device;
a current flows to the first input-output circuit from the second input-output circuit flows through the first path of the fourth electric conduction control device from when the control circuit turns on the third electric conduction control device to when the control circuit turns on the second electric conduction control device;
a part of the current flowing through the first path of the first electric conduction control device flows through the second path of the first electric conduction control device as the control circuit turns on the switch function; and
a part of the current flowing through the first path of the fourth electric conduction control device flows through the second path of the fourth electric conduction control device as the control circuit turns on the switch function is activated by the control circuit.

2. A power converter comprising:
a first input-output circuit;
a second input-output circuit;
first and second capacitors connected in series;
first to fourth electric conduction control devices;
a control circuit that controls turning on and off the first to fourth electric conduction control devices; and
an inductor, and wherein:
the first electric conduction control device connects a positive terminal of the first input-output circuit to a positive terminal of the first capacitor and a positive terminal of the second input-output circuit;
the second electric conduction control device connects the positive terminal of the first input-output circuit to a negative terminal of the first capacitor and a positive terminal of the second capacitor;
the third electric conduction control device connects a negative terminal of the first input-output circuit to the negative terminal of the first capacitor and the positive terminal of the second capacitor;
the fourth electric conduction control device connects the negative terminal of the first input-output circuit to a negative terminal of the second capacitor and a negative terminal of the second input-output circuit;
the first electric conduction control device and the fourth electric conduction control device each comprises a first path allowing a current to flow between the first input-output circuit and the second input-output circuit in one direction, and a second path having a switch function of allowing the current flowing between the first input-output circuit and the second input-output circuit to flow through or to be cut off;
the second electric conduction control device and the third electric conduction control device each have at least the switch function;
a current flows to the second input-output circuit from the first input-output circuit flows through the first path of the first electric conduction control device from when the control circuit turns on the second electric conduction control device to when the control circuit turns on the third electric conduction control device;

the control circuit turns on the switch function to flow a current from the second input-output circuit through the first path of the fourth electric conduction control device to the first input-output circuit to when the control circuit turns on the third electric conduction control device from when the control circuit turns on the second electric conduction control device;

a part of the current flowing through the first path of the first electric conduction control device flows through the second path of the first electric conduction control device as the switch function is turned on by the control circuit;

a part of the current flowing through the first path of the fourth electric conduction control device flows through the second path of the fourth electric conduction control device as the switch function is turned on by the control circuit; and the power converter has a period that the switch function of the second electric conduction control device and the switch function of the third electric conduction control device are simultaneously turned on by the control circuit while the switch function of the first electric conduction control device and the switch function of the fourth electric conduction control device are turned off.

3. The power converter according to claim 2, wherein the inductor is provided on a positive terminal side of the first input-output circuit or a negative terminal side thereof.

4. The power converter according to claim 1, wherein each of the electric conduction control device comprises a Metal-Oxide-Semiconductor Field-Effect Transistor (MOSFET).

* * * * *